United States Patent
Inoue

(10) Patent No.: US 10,242,452 B2
(45) Date of Patent: Mar. 26, 2019

(54) METHOD, APPARATUS, AND RECORDING MEDIUM FOR EVALUATING REFERENCE POINTS, AND METHOD, APPARATUS, AND RECORDING MEDIUM FOR POSITIONAL ALIGNMENT

(71) Applicant: FUJIFILM Corporation, Tokyo (JP)

(72) Inventor: Tsutomu Inoue, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/243,177

(22) Filed: Aug. 22, 2016

(65) Prior Publication Data

US 2017/0061641 A1  Mar. 2, 2017

(30) Foreign Application Priority Data

Aug. 25, 2015 (JP) ................................. 2015-165366

(51) Int. Cl.
 *G06K 9/00* (2006.01)
 *G06T 7/246* (2017.01)

(52) U.S. Cl.
 CPC .... *G06T 7/246* (2017.01); *G06T 2207/10016* (2013.01); *G06T 2207/30056* (2013.01); *G06T 2207/30204* (2013.01)

(58) Field of Classification Search
 CPC ............ G06T 2207/10016; G06T 2207/30204
 See application file for complete search history.

(56) References Cited

U.S. PATENT DOCUMENTS

| | | | |
|---|---|---|---|
| 2009/0310825 A1* | 12/2009 | Bontus | A61B 6/032 382/107 |
| 2011/0013840 A1 | 1/2011 | Iwasaki et al. | |
| 2012/0098986 A1* | 4/2012 | Robertson | H04N 19/523 348/222.1 |
| 2012/0253170 A1 | 10/2012 | Kim et al. | |
| 2015/0051617 A1 | 2/2015 | Takemura et al. | |
| 2015/0342571 A1* | 12/2015 | Ohuchi | A61B 8/0883 382/128 |

(Continued)

FOREIGN PATENT DOCUMENTS

| | | |
|---|---|---|
| JP | 2007-18269 A | 1/2007 |
| JP | 2010-200894 A | 9/2010 |

(Continued)

OTHER PUBLICATIONS

Japanese Office Action issued in corresponding Japanese Patent Application No. 2015-165366 dated Jul. 3, 2018, with English translation.

*Primary Examiner* — Oneal R Mistry
(74) *Attorney, Agent, or Firm* — Birch, Stewart, Kolasch & Birch, LLP

(57) ABSTRACT

An initial position aligning unit performs initial positional alignment of a video and simulation data, and a position aligning unit performs positional alignment of the video and the simulation data. A first movement detecting unit detects movements of reference points which are set within a first image of the video, and a second movement detecting unit detects movement of a camera. A degree of reliability calculating unit compares the first and second movements to calculate a degree of reliability with respect to the movements of each of the reference points.

19 Claims, 5 Drawing Sheets

(56) References Cited

U.S. PATENT DOCUMENTS

| | | | | |
|---|---|---|---|---|
| 2016/0042621 A1* | 2/2016 | Hogg | ................ | G06K 9/00771 |
| | | | | 348/155 |
| 2016/0270743 A1* | 9/2016 | Ogawa | ................... | A61B 6/035 |
| 2016/0350946 A1* | 12/2016 | Schieke | ................ | G06T 11/008 |
| 2018/0064956 A1* | 3/2018 | Yanagawa | ............... | G06T 7/248 |

FOREIGN PATENT DOCUMENTS

| JP | 2010-259497 A | 11/2010 |
|---|---|---|
| JP | 2011-513868 A | 4/2011 |
| JP | 2012-205899 A | 10/2012 |
| JP | 2013-202313 A | 10/2013 |
| WO | WO 2005/038710 A1 | 4/2005 |

* cited by examiner

METHOD, APPARATUS, AND RECORDING MEDIUM FOR EVALUATING REFERENCE POINTS, AND METHOD, APPARATUS, AND RECORDING MEDIUM FOR POSITIONAL ALIGNMENT

CROSS REFERENCE TO RELATED APPLICATIONS

The present application claims priority under 35 U.S.C. § 119 to Japanese Patent Application No. 2015-165366 filed on Aug. 25, 2015. The above application is hereby expressly incorporated by reference, in its entirety, into the present application.

BACKGROUND

The present invention is related to a method, an apparatus, and a program for evaluating the movements of a plurality of reference points within images that constitute a video. In addition, the present invention is related to a method, an apparatus, and a program for aligning the position of a target object included in a video and the position of simulation data of the object.

Recently, surgical simulations that employ three dimensional medical images are being commonly performed. A surgical simulation visualizes tissues and organs which are targets of surgery as well as structures in the peripheries thereof from medical images, and simulates techniques which are to be executed during actual surgery. For example, in a simulation of a partial excision of the liver, tissues including the liver, the portal vein, veins, arteries, the body surface, bones, and a tumor are extracted from tomographic images such as CT (Computed Tomography) images and MRI (Magnetic Resonance Imaging) images and visualized. The extracted tissues are visualized as a three dimensional image, and a simulation image as viewed from a surgical field during surgery is generated. Thereafter, the simulation image is employed to calculate the range of a tumor to be excised within the liver, a surgical plan is generated, and then surgery is performed.

Meanwhile, there is demand to refer to simulation images during surgery. For this reason, simulation images are printed and brought into operating rooms, or displayed on monitors provided in operating rooms. In such cases, physicians can view the printed or displayed simulation image while viewing the surgical portion of an actual patient and perform surgery.

However, performing surgery while alternately viewing a patient and a simulation image is extremely troublesome. For this reason, techniques, in which a portion which is the target of surgery is imaged during surgery to obtain a video constituted by a plurality of images and a simulation image is displayed overlapped on the video, has been proposed. For example Japanese Unexamined Patent Publication No. 2013-202313 discloses a method, in which optical sensors or magnetic sensors are directly mounted on a camera that images the target of surgery, a piece of surgical equipment, or an organ. The relative positional relationships among the sensors are calibrated. Thereafter, a simulation image is moved in response to changes in the position and orientation of the camera as well as movement of the organ after calibrating the sensors, to align the positions of the portion which is the target of surgery and the simulation image. The portion which is the target of surgery and the simulation image, of which the positions have been aligned, are overlapped and displayed in an overlapped manner.

In addition, a method, in which markers are provided at a portion which is a target of surgery, the positions of the markers are detected by a sensor, the positions of the portion which is the target of surgery and a simulation image are aligned and displayed on a head mount display, has been proposed (refer to Japanese Unexamined Patent Publication No. 2010-259497). Further, a method, in which markers are embedded in a portion which is a target of surgery, the markers are detected by a sensor, the positions of the portion which is the target of surgery and a simulation are aligned and displayed on a monitor, has been proposed (refer to Japanese Unexamined Patent Publication No. 2010-200894).

However, it is necessary to utilize expensive sensors in the methods disclosed in Japanese Unexamined Patent Publication Nos. 2013-202313, 2010-259497, and 2010-200894. In addition, there is a limited amount of space in operating rooms, and therefore it is difficult to set sensors within operating rooms. Further, there is a possibility that providing markers in targets of surgery will obstruct surgical operations.

Meanwhile, methods have also been proposed that align the positions of imaged videos of patients and simulation images without employing sensors and the like. For example, Japanese Unexamined Patent Publication No. 2012-205899 proposes a method that generates a model of an organ from a three dimensional image and displays the model of the organ overlapped on ultrasound images in real time, in which affine transform functions are obtained between each frame of the ultrasound image and the model of the organ, the model of the organ is transformed based on the obtained affine transform functions and overlapped onto the ultrasound images.

In order to align the positions of a video during surgery and simulation data, it is necessary for the simulation data to track the movements of a target portion included in the video. In order for the movements to be tracked, it is necessary to accurately detect the movements of the target portion included in the video. For this reason, a method, in which the probability that the movement will be a movement vector which is set in advance is calculated for each point within an image which is a target of movement detection, to generate a movement probability map, has been proposed (refer to Japanese Unexamined Patent Publication No. 2007-018269). In addition, a method for calculating the degree of reliability of movements that represents to what degree movements within images that constitute a video can be relied upon has also been proposed (refer to PCT Japanese Publication No. 2011-513868). By employing the methods disclosed in Japanese Unexamined Patent Publication No. 2007-18269 and PCT Japanese Publication No. 2011-513868, it will be possible to accurately detect movements among images that constitute videos.

SUMMARY

However, the method disclosed in Japanese Unexamined Patent Publication No. 2007-018269 calculates the probability of movements by calculations that employ matrices. Therefore, the amount of calculations required to generate the movement probability map is great, and a certain amount of time is required during processing. In addition, the method disclosed in PCT Japanese Publication No. 2011-513868 calculates the degree of reliability of movement for a video as a whole, and does not calculate degrees of reliability of movements for each point within images that constitute a video. For this reason, the degree of reliability with respect to movement calculated by the method disclosed in PCT Japanese Publication No. 2011-513868 does not correspond to the degree of reliability with respect to each point within images that constitute a video. As a result, it is difficult to accurately detect movements within images employing the degree of reliability disclosed in PCT Japanese Publication No. 2011-513868.

The present disclosure has been developed in view of the foregoing circumstances. The present disclosure enables degrees of reliability with respect to the movements of a plurality of reference points within images that constitute a video to be accurately calculated.

The present disclosure also enables the positions of a target object included in a video and simulation data of the target object to be accurately aligned, employing the degrees of reliability with respect to the movements of a plurality of reference points within images.

A reference point evaluating apparatus of the present disclosure comprises:

imaging means for obtaining a video constituted by at least two images having different imaging times;

first movement detecting means for comparing a first image and a second image of a different time than the first image, from among images that constitute the video, and for detecting the movements of each of a plurality of reference points within the first image between the first image and the second image as first movements;

second movement detecting means for detecting movement of the imaging means between the time when the first image was obtained and the time when the second image was obtained as a second movement; and degree of reliability calculating means for comparing the first movements and the second movement, and for calculating a degree of reliability with respect to the movements of each of the reference points.

A "video" is a moving image constituted by a plurality of consecutive images, which is obtained by the imaging means sequentially performing imaging operations at a predetermined sampling interval.

The "second image of a different time than the first image" may be an image that temporally precedes the first image, or an image that temporally follows the first image. In addition, the second image may be temporally adjacent to the first image, or may be temporally separated from the first image by a plurality of images, the number of which is determined in advance.

The "reference points" refer to points included in the video, which are utilized to detect movements, that is, pixel positions. Specifically, positions having features suited for detecting movements, such as edges, which are the boundaries of objects included in the video, and intersection points at which the edges intersect, may be employed as the reference points. Alternatively, coordinate positions within the video which are determined in advance may be employed as the reference points. Note that the reference points may be specified within the video by an operator, or positions having the above features may be automatically detected from within the video. In addition, the reference points may be automatically set at positions within the video which are determined in advance. Note that the reference points do not include the invariable points, which will be described later.

The "first movements" are indices that represent the movement direction and the movement amount between the reference points within the first image and corresponding reference points included in the second image, which occur between the time that the first image is obtained and the time that the second image is obtained. The first movements are caused by parallel movement and rotational movement of the imaging means. In addition, the reference points will move between the first image and the second image by the video being enlarged or reduced when the imaging means is caused to move close to or away from the target of imaging. Accordingly, the first movements can be defined as changes in the movement amounts of the reference points which are generated between the two images caused by parallel movement, rotational movement, and enlargement and reduction. Note that by analyzing these changes, that is, the amounts of movement, the movement of the imaging means, which is based on the first movements, can be predicted.

The second movement is an index that represents the movement direction and the movement amount of the imaging means which occur between the time that the first image is obtained and the time that the second image is obtained. The second movement is caused by parallel movement and rotational movement of the imaging means. In addition, movement will occur in the video by the video being enlarged or reduced when the imaging means is caused to move close to or away from the target of imaging. For this reason, in the present specification, the movement direction and the movement amount caused by movement in the video due to enlargement and reduction are included in the second movement, in addition to the movement direction and the movement amount due to parallel movement and rotational movement.

The "degree of reliability" is an index that represents the degree to which the movements of the reference points and the movement of the imaging means match. For example, the degree of reliability may be calculated to be 1 in the case that the movements of the reference points match the movement of the imaging means, and to be 0 in the case that the movements of the reference points do not match the movement of the imaging means. Alternatively, the degree of reliability may be calculated as a numerical value that represents the degree of matching between the movements of the reference points and the movement of the imaging means.

Note that the reference point evaluating apparatus of the present disclosure may further comprise a degree of reliability updating means for updating the degree of reliability calculated by the degree of reliability calculating means for each of the plurality of reference points.

In addition, in the reference point evaluating apparatus of the present disclosure, the degree of reliability updating means may update the degree of reliability by designating each temporally sequential image that constitutes the video as the first image, and repeating the processes of detecting the first movements, detecting the second movement, and calculating the degree of reliability.

The expression "designating each temporally sequential image that constitutes the video as the first image" not only refers to a case in which each temporally adjacent image is designated as the first image, but also refers to cases in which images which are temporally separated by a plurality of images, the number of which is determined in advance, are designated as the first image.

In addition, in the reference point evaluating apparatus of the present disclosure, the degree of reliability updating means may update the degree of reliability by correlating repetitively calculated degrees of reliability with each of the plurality of reference points, and cumulatively storing the degrees of reliability.

In addition, in the reference point evaluating apparatus of the present disclosure, the degree of reliability updating means may initialize the cumulatively stored degrees of reliability in the case that the calculation of degrees of reliability has been repeated a first number of times, the number being set in advance.

The expression "initialize the cumulatively stored degrees of reliability" means to restart the cumulative storage of degrees of reliability from the beginning. For example, in the case that the degree of reliability is cumulatively stored as a certain numerical value, the cumulatively stored degree of reliability can be initialized by setting the cumulatively stored numerical value to zero or to a value which is set in advance. Note that the degrees of reliability may be cumulatively added or cumulatively subtracted.

In addition, in the reference point evaluating apparatus of the present disclosure, the first movement detecting means may increase the interval between the first image and the second image in the case that calculation of the degree of reliability is repeated a second number of times, the number being set in advance, such that the interval between the first image and the second image is greater than that prior to the calculation of the degree of reliability being repeated the second number of times.

In addition, in the reference point evaluating apparatus of the present disclosure, the degree of reliability calculating means may exclude reference points having updated degrees of reliability which are less than a first threshold value, which is set in advance, from the calculation of the degree of reliability.

In addition, in the reference point evaluating apparatus of the present disclosure, the second movement detecting means may detect the movement of the imaging means based on the movements of invariable points which are included in each of the first image and the second image.

In this case, the invariable points may be a plurality of markers which are positioned within the imaging range of the imaging means.

The "invariable points" are points, that is, pixel positions, within the imaging range that includes the target object that do not change as imaging of the video progresses. For example, in the case that the target object is a portion which is a target of surgery, pieces of surgical equipment such as forceps for fixing portions of an abdomen during laparotomy, and portions other than the target object are included in the video. In addition, in the case that a part of a target portion is to be excised, the part of the target portion that remains after the excision may be employed as an invariable point. Note that the invariable points may be detected automatically, or specified by an operator.

In addition, in the reference point evaluating apparatus of the present disclosure, the first movement detecting means may set a plurality of reference points within a region surrounded by a plurality of markers in the first image.

In addition, in the reference point evaluating apparatus of the present disclosure, the second movement detecting means may be a sensor provided on the imaging means that detects movement of the imaging means.

A position aligning apparatus of the present disclosure comprises:

the reference point evaluating apparatus of the present disclosure;

simulation data obtaining means for obtaining simulation data of a target object included in the video;

initial position aligning means for performing initial positional alignment of the target object included in the video and the simulation data; and positional aligning means for performing positional alignment of the target object included in the video and the simulation data based on the second movement.

The "simulation data" refers to arbitrary data related to the target object. For example, an image that represents the three dimensional shape of the target object, an image that represents the three dimensional shapes of the target object and structures included in the target object, or an image that represents the contours of the target object and the structures included in the target object may be employed as the simulation data. Note that in the case that the target object is a structure within a human body, image data such as functional three dimensional images obtained by PET (Positron Emission Tomography) examination or NM (Nuclear Medical) examination may be employed as the simulation data, in addition to the aforementioned CT images and MRI images. In addition, text data such as the name of the target object and the names of the structures included within the target object, as well as symbols such as lines and arrows that indicate an excision position in the case that the target object is a structure within a human body, may be employed as the simulation data.

Note that in the position aligning apparatus of the present disclosure, the position aligning means may perform a first judgment regarding whether it is possible to detect the second movement, perform positional alignment of the target object included in the video and the simulation data based on the second movement in the case that the result of the first judgment is affirmative, and perform positional alignment of the target object included in the video and the simulation data based on first movements of reference points having degrees of reliability greater than or equal to a second threshold value, which is set in advance, in the case that the result of the first judgment is negative.

The "degrees of reliability" may be those calculated by the degree of reliability calculating means. Note that in the case that the degree of reliability is updated, the updated degree of reliability may be employed.

In addition, in the position aligning apparatus of the present disclosure, the position aligning means may perform a second judgment regarding whether a reference point having a degree of reliability greater than or equal to the second threshold value exists, perform positional alignment of the target object included in the video and the simulation data based on the movements of reference points having degrees of reliability greater than or equal to the second threshold value in the case that the result of the first judgment is negative and the result of the second judgment is affirmative, and issue a warning in the case that the result of the first judgment is negative and the result of the second judgment is negative.

Here, if the result of the first judgment is negative and the result of the second judgment is also negative, it will not be possible to perform accurate positional alignment of the target object included in the video and the simulation data. The "warning" means notifying the operator that it is not possible to perform accurate positional alignment of the target object included in the video and the simulation data. Specifically, an audio warning may be issued, or text or the like may be displayed by a display means.

A reference point evaluating method of the present disclosure comprises:

obtaining a video constituted by at least two images having different imaging times;

comparing a first image and a second image of a different time than the first image, from among images that constitute the video, and detecting the movements of each of a plurality of reference points within the first image between the first image and the second image as first movements;

detecting movement of an imaging means between the time when the first image was obtained and the time when the second image was obtained as a second movement; and comparing the first movements and the second movement, and calculating a degree of reliability with respect to the movements of each of the reference points.

A position aligning method of the present disclosure comprises:

detecting first movements, detecting a second movement, and calculating a degree of reliability by the reference point evaluating method of the present disclosure;

obtaining simulation data of a target object included in the video;

performing initial positional alignment of the target object included in the video and the simulation data; and performing positional alignment of the target object included in the video and the simulation data based on the second movement.

Note that the reference point evaluating method and the position aligning method of the present disclosure may be provided as programs that cause a computer to execute these methods.

According to the reference point evaluating apparatus, the reference point evaluating method, and the reference point evaluating program of the present disclosure, a first image and a second image of a different time than the first image, from among images that constitute a video constituted by at least two images having different imaging times, are compared, and the movements of each of a plurality of reference points within the first image between the first image and the second image are detected as first movements. In addition, movement of an imaging means between the time when the first image was obtained and the time when the second image was obtained is detected as a second movement. Then, the first movements and the second movement are compared, and a degree of reliability is calculated with respect to the movements of each of the reference points. Therefore, the degree of reliability with respect to the movements of each of the reference points can be accurately calculated without performing complex calculations. Accordingly, the movements of the reference points can be accurately evaluated based on the calculated degrees of reliability.

According to the position aligning apparatus, the position aligning method, and the position aligning program of the present disclosure, simulation data of a target object included in the video is obtained; initial positional alignment of the target object included in the video and the simulation data is performed; and positional alignment of the target object included in the video and the simulation data is performed based on the second movement. Therefore, movement of the simulation data can track movement in the video caused by movement of an imaging means.

DETAILED DESCRIPTION OF THE PREFERRED EMBODIMENTS

Figure 1:
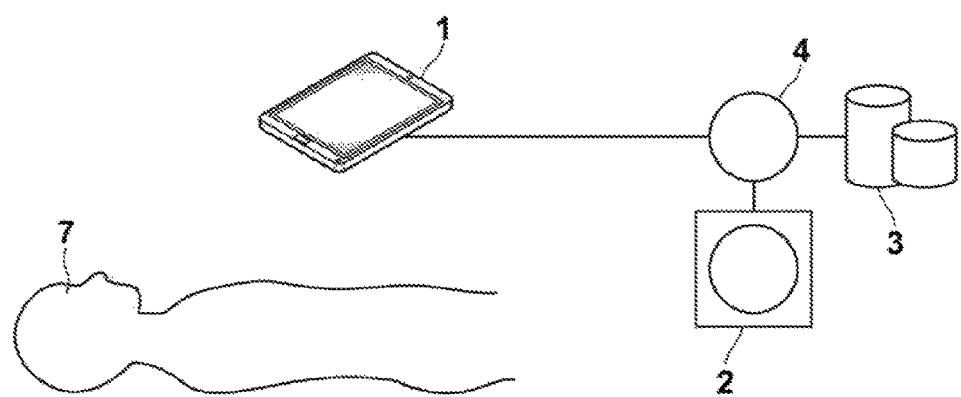
FIG. 1 is a schematic diagram that illustrates the hardware configuration of a surgery assisting system to which a reference point evaluating apparatus and a position aligning apparatus according to embodiments of the present disclosure are applied.

Hereinafter, embodiments of the present disclosure will be described with reference to the attached drawings. FIG. 1 is a schematic diagram that illustrates the hardware configuration of a surgery assisting system to which a reference point evaluating apparatus and a position aligning apparatus according to embodiments of the present disclosure are applied. In this system, a position aligning apparatus 1 according to an embodiment of the present disclosure, a three dimensional image obtaining apparatus 2, and an image storage server 3 are connected via a network 4 such that the components are capable of communicating with each other, as illustrated in FIG. 1. Note that the position aligning apparatus 1 includes a reference point evaluating apparatus according to an embodiment of the present disclosure.

The three dimensional image obtaining apparatus 2 images a portion of a subject 7 which is a target of surgery, to generate a three dimensional image V0 that represents the portion of the subject 7. Specific examples of the three dimensional image obtaining apparatus 2 include a CT apparatus, an MRI apparatus, and a PET apparatus. The three dimensional image V0 which is generated by the three dimensional image obtaining apparatus 2 is transmitted to the image storage server 3 and stored therein. Note that in the present embodiment, the portion of the subject 7 which is the target of surgery is the liver, the three dimensional image obtaining apparatus 2 is a CT apparatus, and a three dimensional image V0 of the abdomen of the subject 7 is generated.

The image storage server 3 is a computer that stores and manages various types of data, and is equipped with a large capacity external memory device and database management software. The image storage server 3 communicates with the other components of the system via a wired or a wireless network 4, to transmit image data and the like. Specifically, image data such as the three dimensional image V0 which is generated by the three dimensional image obtaining apparatus 2 are obtained via the network, then stored within a recording medium such as the large capacity external memory device and managed. Note that the storage format of image data and communications among each component of the system are based on a protocol such as the DICOM (Digital Imaging and Communication in Medicine) protocol.

The position aligning apparatus 1 is a single computer in which a position aligning program of the present disclosure is installed. In the present embodiment, the computer is a tablet terminal that a physician who performs diagnosis operates directly, which is connected to the network 4. The position aligning program is recorded on recording media such as a DVD (Digital Versatile Disc) and a CD-ROM (Compact Dick Read Only Memory) which are distributed, and installed onto the tablet terminal from the recording medium. Alternatively, the position aligning program is stored in a recording device of a server computer connected to a network or in a network storage, in a state accessible from the exterior, downloaded to the tablet terminal according to a request, then installed therein.

Figure 2:
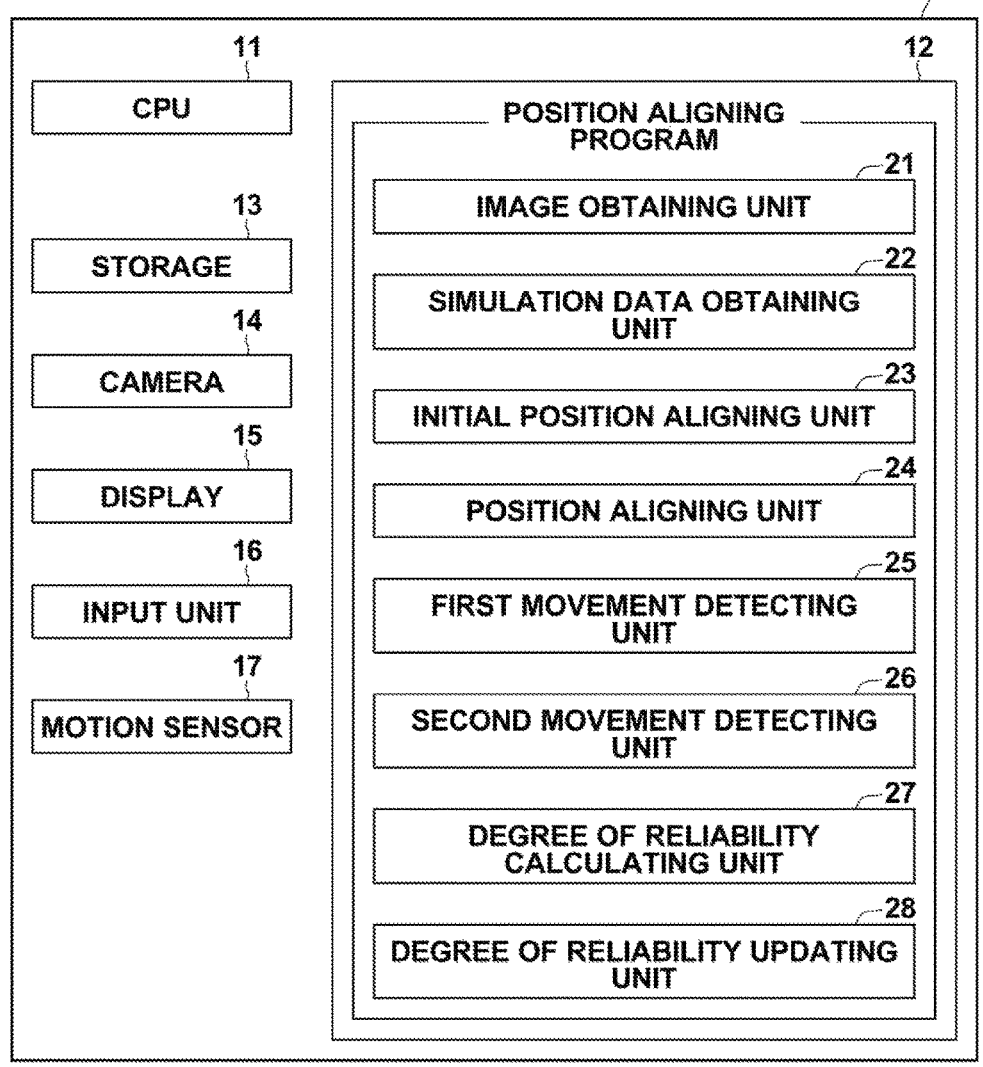
FIG. 2 is a schematic diagram that illustrates the configuration of a position aligning apparatus which is realized by installing a position aligning program in a tablet terminal.

FIG. 2 is a schematic diagram that illustrates the configuration of a position aligning apparatus which is realized by installing a position aligning program in a tablet terminal. The position aligning apparatus 1 is equipped with a CPU (Central Processing Unit) 11, a memory 12, a storage 13, a camera 14, a display 15 such as a liquid crystal display, a touch panel input unit 16, and a motion sensor 17, as standard components of a tablet terminal.

The storage 13 has recorded therein various types of data, including the three dimensional image V0 which is obtained from the image storage server 3 via the network 4 and images which are generated by processes performed by the position aligning apparatus 1.

The camera 14 is equipped with a lens, an imaging element such as a CCD (Charge Coupled Device), an image processing unit that performs processes to improve the image quality of obtained images, etc. The physician employs the camera 14 of the position aligning apparatus 1, that is, the tablet terminal, to image the liver of the subject 7 who is undergoing a laparotomy, which is the target of surgery, to obtain a video L0 during surgery which is constituted by at least two images having different imaging times that include the liver. The video L0 is a video in which continuous images T0 during surgery are consecutively displayed at a predetermined frame rate. Note that the camera 14 corresponds to an imaging means.

The motion sensor 17 is a nine axis motion sensor that detects acceleration, angular speed, and inclinations in three axes, which are the x axis, the y axis, and the z axis. The acceleration, the angular speed, and the inclination are output to the CPU 11 as movement data, and utilized for necessary processes.

In addition, the position aligning program is stored in the memory 12. The position aligning program defines an image obtaining process that obtains the video L0 and the three dimensional image V0; a simulation data obtaining process that obtains simulation data S0 of the liver, which is the target object included in the video L0; an initial position aligning process that performs initial positional alignment of the liver, which is the target object included in the video L0, and the simulation data S0; and a position aligning process that performs positional alignment of the liver included in the video L0 and the simulation data S0, as processes to be executed by the CPU 11. Further, the reference point evaluating program, which is included in the position aligning program, defines a first movement detecting process that compares a first image T1 and a second image T2 of a different time than the first image T1, from among images that constitute the video L0, and detects the movements of each of a plurality of reference points within the first image T1 between the first image T1 and the second image T2 as first movements M1; a second movement detecting process that detects movement of the camera 14 between the time when the first image T1 was obtained and the time when the second image T2 was obtained as a second movement M2; a degree of reliability calculating process that compares the first movements M1 and the second movement M2, and calculates a degree of reliability with respect to the movements of each of the reference points, and a degree of reliability updating process that updates the degree of reliability with respect to each of the reference points, as processes to be executed by the CPU 11.

The tablet terminal functions as an image obtaining unit 21, a simulation data obtaining unit 22, an initial position aligning unit 23, a position aligning unit 24, a first movement detecting unit 25, a second movement detecting unit 26, a degree of reliability calculating unit 27, and a degree of reliability updating unit 28, by the CPU executing the above processes according to the program. Note that the position aligning apparatus 1 may be equipped with processors that execute each of the image obtaining process, the simulation data obtaining process, the initial position aligning process, the position aligning process, the first movement detecting process, the second movement detecting process, the degree of reliability calculating process, and the degree of reliability updating process, respectively. Here, the first movement detecting unit 25, the second movement detecting unit 26, the degree of reliability calculating unit 27, and the degree of reliability updating unit 28 constitute a reference point evaluating apparatus of the present disclosure.

The image obtaining unit 21 obtains the three dimensional image V0 and the video L0 imaged by the camera 14 that includes the target object of the subject 7 during surgery. The image obtaining unit 21 may obtain the three dimensional image V0 from the storage 13, if the three dimensional image V0 is already recorded in the storage 13. Note that in the present embodiment, the video L0 is obtained by the physician imaging the liver from above the subject 7, who is undergoing a laparotomy.

The simulation data obtaining unit 22 generates simulation data of the liver, which is the target of surgery. Therefore, first, the simulation data obtaining unit 22 extracts the liver, which is the target of surgery, as well as hepatic arteries, hepatic veins, and a lesion, which are included in the liver, from the three dimensional image V0. The simulation data obtaining unit 22 is equipped with classifiers that discriminate whether each pixel within the three dimensional image V0 is a pixel that represents the liver, as well as arteries, veins, and the lesion which are included in the liver (hereinafter, referred to as "liver, etc."). The classifiers are obtained by performing machine learning of a plurality of sample images that include the liver, etc., by employing a method such as the ADA Boost algorithm. The simulation data obtaining unit 22 employs the classifiers to extract the liver, etc. from the three dimensional image V0.

The simulation data obtaining unit 22 generates an image that represents the three dimensional shape of the liver, etc. as simulation data S0. Specifically, a projected image which is the extracted liver, etc. projected onto a predetermined projection plane is generated as the simulation data S0. Here, the projection plane may be a plan that views the liver of the subject 7 from the front, for example. Note that the specific projection method may be the known volume rendering technique or the like.

Figure 3:
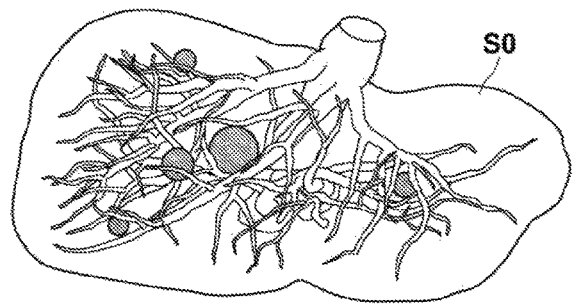
FIG. 3 is a diagram that illustrates simulation data.

At this time, the simulation data S0 may be generated by assigning different colors to each of the liver, hepatic arteries, hepatic veins, and the lesion. Alternatively, the simulation data S0 may be generated by assigning different degrees of opacity to each of the liver, hepatic arteries, hepatic veins, and the lesion. For example, hepatic arteries may be displayed red, hepatic veins may be displayed blue, and the lesion may be displayed green, or the degree of opacity of the liver may be set to 0.1, the degree of opacity of the hepatic arteries and hepatic veins may be set to 0.5, and the degree of opacity of the lesion may be set to 0.8. Thereby, simulation data S0 such as that illustrated in FIG. 3 is generated. By assigning a different color or a different degree of opacity to each of the liver, as well as the hepatic arteries, the hepatic veins, and the lesion included in the liver, discrimination of the liver, as well as the hepatic arteries, the hepatic veins, and the lesion included in the liver can be facilitated. Note that the simulation data S0 may be generated by assigning both different colors and different degrees of opacity. The generated simulation data S0 is stored in the storage 13.

Alternatively, the simulation data S0 may be that which includes only the contours of the liver, etc. By adopting this configuration, viewing of the surgical field in the display 15 becoming difficult when the simulation data S0 and the video L0 are overlapped and displayed, as will be described later, can be prevented.

Hereinafter, the processes which are performed by the present embodiment, as well as the initial position aligning unit 23, the position aligning unit 24, the first movement detecting unit 25, the second movement detecting unit 26, the degree of reliability calculating unit 27, and the degree of reliability updating unit 28 will be described.

Figure 4:
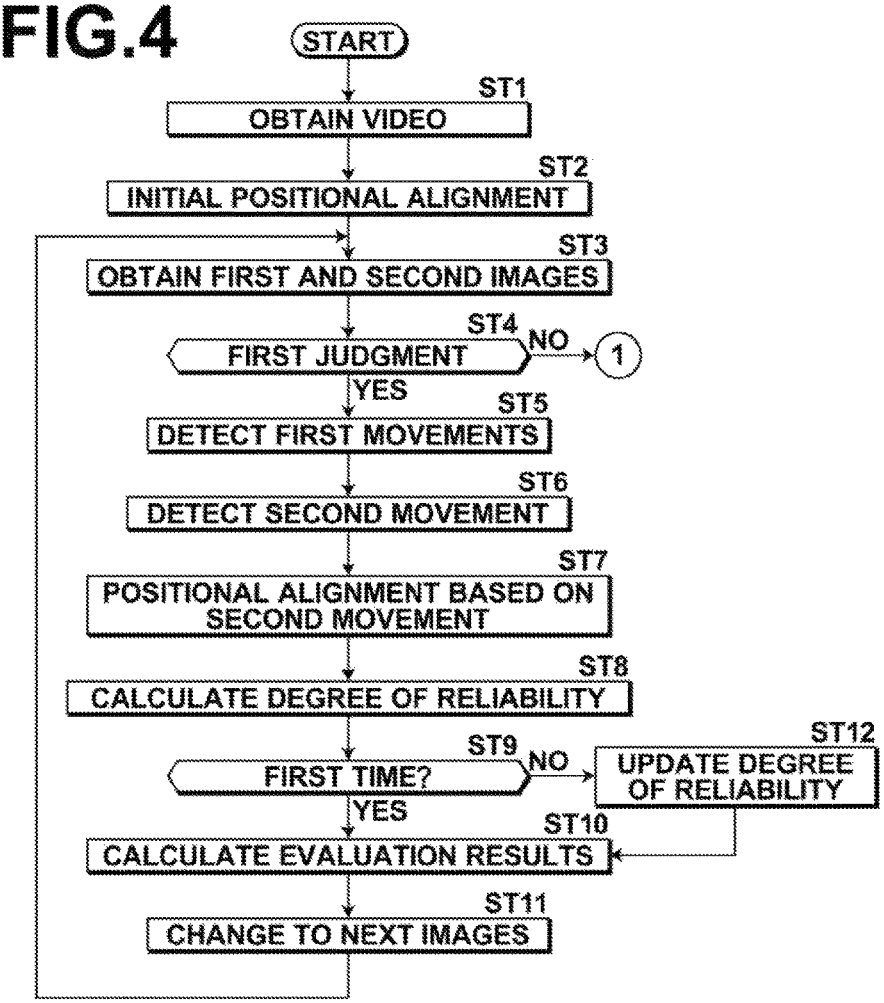
FIG. 4 is a flow chart that illustrates the processes performed by the embodiment of the present disclosure.
Figure 5:
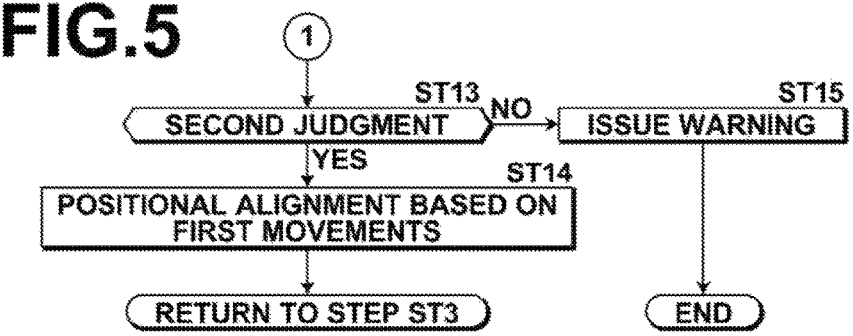
FIG. 5 is a flow chart that illustrates the processes performed by the embodiment of the present disclosure.

FIG. 4 and FIG. 5 are flow charts that illustrate the processes which are performed by the present embodiment. Note that it is assumed that simulation data S0 has already been generated and is stored in the storage 13. First, the liver of the subject 7, which is the target of surgery, is imaged, to obtain a video L0 (step ST1). Note that the video L0 is constituted by images T0 which are sequentially obtained during surgery at a predetermined frame rate of 30 fps, for example. Then, the initial position aligning unit 23 performs initial positional alignment of the liver included in the video L0 and the simulation data S0 (step ST2).

Figure 6:
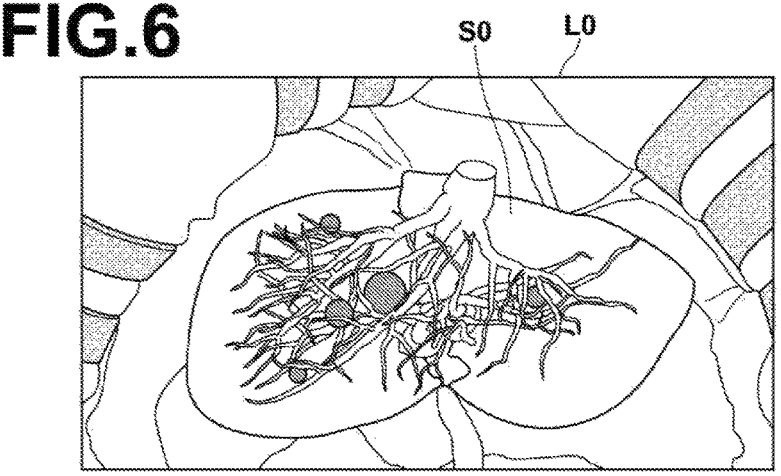
FIG. 6 is a diagram that illustrates a video which is displayed on a display during initial positional alignment.

FIG. 6 is a diagram that illustrates a video which is displayed on a display during initial positional alignment. During initial positional alignment, the initial position aligning unit 23 overlaps the simulation data S0 onto the video L0, and displays the video L0 having the simulation data S0 overlapped thereon on the display 15. Note that at this stage, the simulation data S0 is displayed at a position on the display 15 which is determined in advance. The displayed simulation data S0 is capable of undergoing parallel movement, rotation, magnification, and reduction in response to operations of the input unit 16, that is, by touch operations administered on the display 15. Note that if an x axis and a y axis are set in the display surface of the display 15 and a z axis is set in the direction perpendicular to the display surface, rotation is possible in arbitrary directions of the three axes. Here, in the case that rotation of the simulation data S0 other than rotation within the xy plane, that is, rotation about the x axis and/or the y axis is performed, and the orientation of the simulation data S0 is changed, the projection plane of the simulation data S0 will change. For this reason, the simulation data obtaining unit 22 regenerates the simulation data S0 in the case that the orientation of the simulation data S0 changes and the projection plane thereof changes as a result.

In addition, the video L0 which is displayed during initial positional alignment is a moving image. Alternatively, a single image T0 that constitutes the video L0 may be displayed. In the present embodiment, the video L0 is displayed. In addition, it is preferable for the position of the tablet terminal to be adjusted such that the entirety of the surgical field is included in the video L0.

A physician moves, rotates, enlarges, or reduces the simulation data S0 such that the position of the simulation data S0 matches the position of the liver included in the video L0, while viewing the video L0 and the simulation data S0 which are displayed on the display 15. In addition, the physician may change the orientation of the simulation data S0 if necessary. When the position, the rotational position, the size, and the orientation of the simulation data S0 match the position of the liver included in the video L0, the physician specifies invariable points via the input unit 16.

Figure 7:
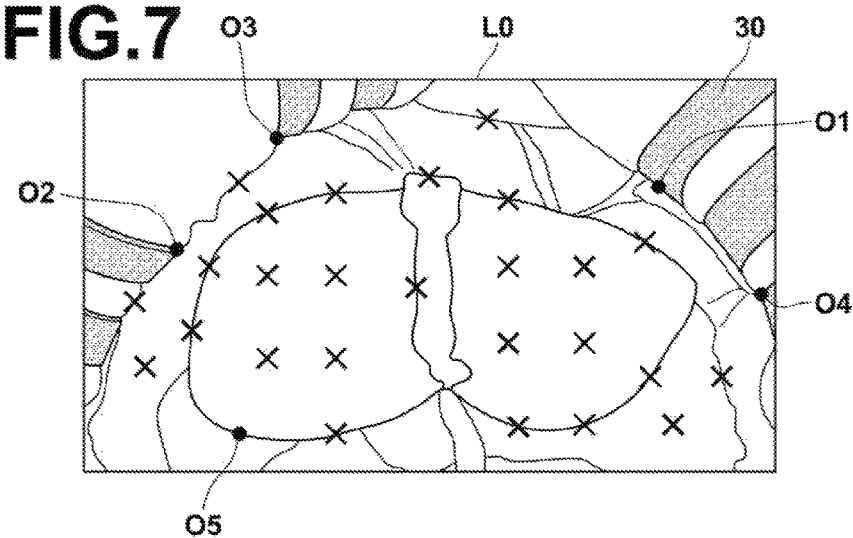
FIG. 7 is a diagram for explaining setting of invariable points and reference points.

In the present embodiment, the target of surgery is the liver, and there is a possibility that the liver will be excised and moved during surgery. For this reason, in the present embodiment, specification of invariable points within the video L0, which is displayed on the display 15, that do not move during surgery is received during initial positional alignment. For example, portions within the video L0, at which surgical implements such as forceps 30 are present as illustrated in FIG. 7, will not move during surgery. In addition, in the case that the left lobe of the liver is to be excised, the right lobe of the liver will not move during surgery. For this reason, specification of positions O1 through O4 along the edge of the forceps 30 or a position O5 of the right lobe of the liver as invariable points are received via the input unit 16 and stored in the storage 13 in the present embodiment. Note that FIG. 7 illustrates an example in which specification of five invariable points is received. However, the number of invariable points is not limited, and an arbitrary number of one or more invariable points may be specified.

Further, specification of a plurality of reference points within the video L0 displayed on the display 15 is received following the specification of the invariable points in the present embodiment. Positions having features which are suited for detection of movement of the display 15 may be specified as the reference points. For example, positions having features suited for detecting movements, such as edges, which are the boundaries of objects included in the video, and intersection points at which the edges intersect, may be employed as the reference points. Alternatively, arbitrary positions within the video L0 may be employed as the reference points. In the present embodiment, arbitrary positions within the video L0 are employed as the reference points. In addition, the reference points are to be specified at positions other than those of the invariable points O1 through O5. Note that in FIG. 7, the specified reference points are indicated by the symbols "X". The positions of the specified reference points are stored in the storage 13.

Commands to specify the invariable points and the reference points by operating the input unit 16 may be input by displaying buttons to input commands to specify the invariable points and the reference points on the display 15, or by performing a predetermined operation such as a double tap. When specifying the invariable points and the reference points, the video L0 may be a still image. In addition, display of the simulation data S0 may be temporarily ceased at this time.

Note that a case in which the physician specifies the invariable points and the reference points is described above. Alternatively, positions having the features of edges, which are the boundaries of objects included in the video L0, and intersection points at which the edges intersect, may be automatically detected to set the invariable points and the reference points. Note that the reference points may alternatively be set at coordinate positions within the video L0, which are determined in advance.

After specifying the invariable points and the reference points, the physician employs the input unit 16 to input a command indicating that initial positional alignment is completed, to complete the initial positional alignment. Note that the command indicating that initial positional alignment is completed by operating the input unit 16 may be input by displaying a button to input the command indicating completion on the display 15, or by performing a predetermined operation such as a double tap. Thereby, the image T0 which had been being displayed on the display 15 when initial positional alignment is completed is stored in the storage 13 as an initial image Tf In addition, the rotational angle, the amount of parallel movement, and the magnification rate of the simulation data S0 with respect to the initial image Tf at this time is also recorded in the storage 13.

After initial positional alignment, the physician proceeds with surgery. It is not possible for the physician to constantly hold the tablet terminal above the subject 7 during surgery. Therefore, imaging of the target portion by the tablet terminal is temporarily ceased, and the target portion is imaged when imaging becomes necessary thereafter, such as to confirm the position of a lesion, etc. At this time, the position of the tablet terminal is moved from the position at which initial positional alignment was performed, and imaging of the target portion is performed again. Even in the case that the tablet terminal is held constantly above the subject 7 after initial positional alignment, it is not possible to maintain the tablet terminal completely still. Therefore, the positon of the tablet terminal is moved from the positon at which initial positional alignment was performed.

Figure 8:
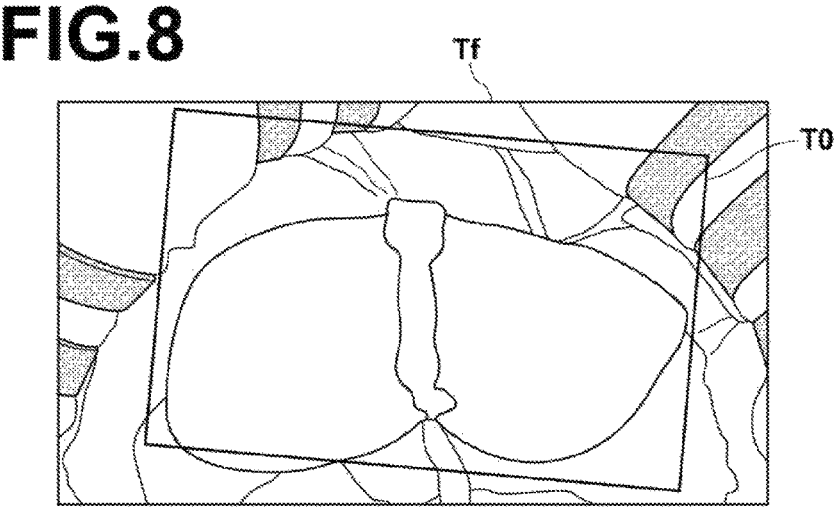
FIG. 8 is a diagram for explaining a shift in position between an initial surgery image and a presently displayed surgery image.

Under such circumstances, the position of the camera 14 is shifted from the position at which the initial image Tf was obtained. Therefore, the position of the image T0 which is displayed on the display 15 is shifted from that of the initial image Tf, as illustrated in FIG. 8, for example. Note that in FIG. 8, the tablet terminal is closer to the subject 7, rotated clockwise, and has moved slightly toward the right side compared to the time when the initial image Tf was obtained.

For this reason, in the present embodiment, the position aligning unit 24 performs positional alignment of the liver included in the video L0 and the simulation data S0. In addition, the reference point evaluating process is performed along with the position aligning process. First, the first movement detecting unit 25 obtains a first image T1 ad a second image T2 of a different time than the first image T1, from among images that constitute the video L0 (step ST3). The first image T1 may be the initial image Tf, or may be an image which is displayed on the display 15 after a predetermined amount of time elapses after initial positional alignment is completed. In the case that an image other than the initial image Tf is designated as the first image T1, the invariable points and the reference points which were specified in the initial image Tf are employed as references for performing template matching between the initial image Tf and the image T1. Thereby, invariable points and reference points corresponding to the invariable points and the reference points which were specified within the initial image Tf are set within the first image T1.

In the present embodiment, the second image T2 is an image T0 that temporally follows the first image T1. Note that the second image T2 may be an image one frame following the first image T1, or an image of a frame after a predetermined amount of time after the first image T1. Note that the image obtaining unit 21 or the position aligning unit 24 may obtain the first image T1 and the second image T2.

Next, the position aligning unit 24 performs a first judgment regarding whether it is possible to detect a second movement M2, which is movement of the camera between the time that the first image T1 was obtained and the time that the second image T2 was obtained (step ST4). The first judgment may be performed by judging whether the aforementioned invariable points are detected within the second image T2.

If the result of the first judgment is affirmative, the first movement detecting unit 25 detects the movements of each of the plurality of reference points within the first image T1 between the first image T1 and the second image T2 as first movements M1 (step ST5). In the present embodiment, the first movement detecting unit 25 calculates optical flows between the plurality of reference points (hereinafter, referred to as "reference points B1" for the sake of explanation) within the first image T1 and a plurality of reference points B2 within the second image T2 that respectively correspond to the reference points B1 as first movements M1. The optical flows are the trajectories of the reference points between the first and second images T1 and T2, and are vectors that represent the movement directions and movement amounts of the reference points. Note that the first movements M1 of the reference points B1 may be calculated by template matching instead of the optical flows.

Next, the second movement detecting unit 26 detects movement of the camera 14 between the time when the first image T1 was obtained and the time when the second image T2 was obtained as a second movement M2 (step ST6). Note that the movement of the camera 14 is practically the movement of the tablet terminal. In the present embodiment, the second movement detecting unit 26 calculates optical flows between the invariable points O1 through O5 within the first image T1 and positions within the second image T2 corresponding to the invariable points O1 through O5, and calculates an average value of the optical flows of the invariable points O1 through O5 as the second movement M2. Note that the optical flow of any one of the invariable points O1 through O5, the maximum value among the optical flows, or he minimum value among the optical flows may be calculated as the second movement M2. In addition, second movement M2 may be calculated by template matching instead of the optical flows.

Note that in the present embodiment, the tablet terminal is equipped with the motion sensor 17. For this reason, movement of the tablet terminal detected by the motion sensor 7 may be employed as the second movement M2. Thereby, the second movement M2 can be detected expediently without performing calculations. In this case, the movement of the tablet terminal detected by the motion sensor 17 is three dimensional movement. For this reason, the second movement detecting unit 26 is configured to detect the second movement M2 by converting the three dimensional movement detected by the motion sensor 17 to two dimensional movement within the display plane of the display 15.

Note that the process of step ST6 may be performed prior to step ST4. In this case, the first judgment process of step ST4 may judge whether the second movement M2 has been detected by the second movement detecting unit 26.

Next, the position aligning unit 24 performs positional alignment of the liver include in the second image T2 and the simulation data S0 based on the second movement M2, then overlaps and displays the second image T2 and the simulation data S0 on the display 15 (step ST7: positional alignment based on the second movement). Here, the second movement M2 is calculated as a movement vector that represents a parallel movement component, a rotational component, and a magnification ratio of the second image T2 with respect to the first image T1. For this reason, the position aligning unit 24 moves the simulation data S0 for an amount of movement corresponding to the second movement M2, and overlaps the simulation data S0 on the second image T2. Thereby, the simulation data S0 is overlapped onto the second image T2 at a position similar to the position of the liver when the position of the simulation data S0 is aligned with the first image T1, that is, the initial image Tf. Note that the process of step ST5 may be performed after step ST7.

Next, the degree of reliability calculating unit 27 compares the first movements M1 and the second movement M2, and calculates a degree of reliability with respect to the movements of each of the reference points B1 (step ST8). Here, the second movement M2 is calculated based on the invariable points within the video L0. Therefore, the second movement M2 accurately represents the movement of the tablet terminal. Meanwhile, the first movements M1 are calculated based on the reference points different from the invariable points, and should match the movement of the tablet terminal. However, there are cases in which the first movements M1 and the movement of the tablet terminal do not match, depending on the locations at which the reference points are set. For example, in the case that a reference point is set at a position at which movement is difficult to be detected, such as a position which is not on an edge within the video L0, there is a possibility that the first movement M1 calculated at this reference point will not match the movement of the tablet terminal.

For this reason, the present embodiment calculates an index that represents the degree of matching between the movements of the reference points and the movement of the camera 14, that is, the first movements M1 and the second movement M1, as a degree of reliability. In the present embodiment, the first movements M1 and the second movement M2 are both calculated as movement vectors. Therefore, the movements of the reference points approximate the movement of the camera 14 to a greater degree as the difference between the first movements M1 and the movement M2 is smaller. Therefore, the degree of reliability calculating unit 27 defines a decreasing function f (x) that yields a maximum value when an input x is 0, employs the absolute value of the difference between the first movements M1 and the second movement M2 as the input, and calculates the degree of reliability according to the decreasing function f (x). Note that the maximum value of the degree of reliability may be 1, for example.

Next, the degree of reliability updating unit 28 judges whether the number of times that the degree of reliability has been calculated is 1 (step ST9). In the case that the result of judgment at step ST9 is affirmative, the degree of reliability updating unit 28 stores the degree of reliability, correlated with the reference points B1 of the first image T1, to calculate the evaluation results for the movements of each of the plurality of reference points B 1(step ST10). Then, the first image T1 is changed to a next image (step ST11), and the process returns to step ST3. Note that the "next image" is an image of a frame following the first image T1, that is, the second image T2 during the current process. In addition, the second image T2 is also changed to the image of a next frame accompanying this change. Thereby, positional alignment and calculation of a new degree of reliability employing the next first and second images T1 and T2 are repeated.

Meanwhile, in the case that the result of judgment at step ST9 is affirmative, the degree of reliability updating unit 28 updates the degree of reliability (step ST12), and the process proceeds to step ST10. In this case, the updated degree of reliability is stored correlated with the reference points B1 of the first image T1, to calculate updated evaluation results for the movements of each of the plurality of reference points B1. In the present embodiment, degrees of reliability are cumulatively stored, correlated with each of the plurality of reference points B1, to update the degree of reliability. Here, the degrees of reliability may be cumulatively added or cumulatively subtracted.

Note that the degree of reliability may be updated by replacing the degree of reliability calculated in a previous process with a newly calculated degree of reliability, instead of cumulatively storing the degree of reliability. In addition, when the cumulative storage has been repeated a predetermined times, the degree of reliability for each reference point may be compared against a threshold value Th1, and reference points having updated degrees of reliability which are less than the threshold value Th1 may be excluded from calculation of the degree of reliability. Note that the threshold value Th1 corresponds to the first threshold value. Thereby, after such reference points are excluded, calculation and updating of only reference points having high degrees of reliability need to be performed. Therefore, the amount of calculations required to calculate and update the degree of reliability can be reduced.

In addition, in the reference point evaluating apparatus of the present disclosure, the cumulatively stored degrees of reliability may be initialized and set to 0 in the case that the calculation of degrees of reliability has been repeated a predetermined number of times. In this case, calculation of the degrees of reliability will be restarted. Thereby, the degrees of reliability can be calculated from the beginning even in cases that the video changes greatly. Therefore, accurate calculation of degrees of reliability can be continued.

In addition, the processes from step ST8 through ST12 may be performed parallel with the process of step ST7, or performed prior to the process of step ST7.

Meanwhile, if the result of the first judgment at step ST4 is negative, the position aligning unit 24 refers to the evaluation results of the movements, and performs a second judgment regarding whether reference points having degrees of reliability greater than or equal to a predetermined threshold value Th2 are present in the evaluation results (step ST13). Note that the threshold value Th2 corresponds to the second threshold value. Here, the degree of reliability is an index that represents the degree of matching between the first movements M1 and the second movement M2. Therefore, that the degree of reliability is greater than or equal to the threshold value Th2 means that the first movement M1 at such reference points comparatively matches the movement of the camera 14. For this reason, if the result of judgment in step ST13 is positive, the position aligning unit 24 performs positional alignment of the liver included in the video L0 and the simulation data S0 based on the first movements M1 of reference points having degrees of reliability greater than or equal to the threshold value Th2, overlaps the simulation data S0 on the second image T2, and displays the overlapped simulation data S0 and the second image T2 on the display 15 (step ST14: positional alignment based on first movements). Thereafter, the process returns to step ST3.

Note that the threshold value Th2 may be changed according to the number of times that the degree of reliability is updated. Specifically, the threshold value Th2 may be increased as the number of times that the degree of reliability is updated becomes greater.

In the case that the result of judgment at step ST14 is negative, it is not possible to accurately align the positions of the second image T2 and the simulation data S0 employing the detected first movements M1. Therefore, the position aligning unit 24 issues a warning (step ST15), and the process ends. The waring may be text reading "Please redo initial positional alignment" or the like displayed on the display 15, or an audio message reading the text. In addition, the warning is not limited to these formats, and may be of any format, such as causing the screen of the display 15 to blink or generating a beeping sound, as long as a physician can be made aware that accurate positional alignment of the second image T2 and the simulation data S0 is not possible. An operator may redo the initial positional alignment after receiving the warning. A command to redo the initial positional alignment may be input via the input unit 16. After redoing initial positional alignment, the processes of step ST3 and the steps subsequent thereto are performed.

As described above, the present embodiment compares the first movements M1 and the second movement M2, and calculates a degree of reliability with respect to the movements of each of the reference points. Therefore, the degree of reliability with respect to the movements of each of the reference points can be accurately calculated without performing complex calculations. Accordingly, the movements of the reference points can be accurately evaluated based on the calculated degrees of reliability.

In addition, initial positional alignment of the liver, which is the target object included in the video L0, and the simulation data S0 is performed; and positional alignment of the target object included in the video L0 and the simulation data S0 is performed based on the second movement M2. Therefore, movement of the simulation data S0 can track movement in the video caused by movement of the camera 14.

In addition, the degree of reliability for each of the plurality of reference points is updated. Thereby, movements of the reference points can be evaluated based on the latest degrees of reliability.

In addition, movement of the camera 14 can be accurately detected, by detecting the second movement M2 based on the movements of invariable points which are included in each of the first image T1 and the second image T2.

In addition, positional alignment is performed based on the second movement M2 in the case that the result of the first judgment is affirmative, and positional alignment is performed based on the first movements M1 of reference points having degrees of reliability greater than or equal to the predetermined threshold value Th2 in the case that the result of the first judgment is negative. Thereby, movement of the simulation data S0 can accurately track movement in the video caused by movement of the camera 14 even in cases that movement of the camera 14 cannot be detected for any reason.

Note that in the embodiment described above, the interval between the first image T1 and the second image T2 when calculating the degrees of reliability may be increased in the case that calculation of the degrees of reliability is repeated a predetermined number of times to be greater than that prior to the calculation of the degree of reliability being repeated the predetermined number of times. For example, in the case that the second image T2 is an image of a frame immediately temporally following the first image T1, the second image T2 may be changed to an image which is temporally separated from the first image T1 by a predetermined number of frames. By adopting this configuration, the frequency at which the degrees of reliability are calculated can be decreased. Therefore, the amount of calculations required to calculate the degrees of reliability can be reduced. In addition, the degrees of reliability are updated after being calculated a predetermined number of times. Therefore, the accuracy of the updated degrees of reliability will also be maintained.

Figure 9:
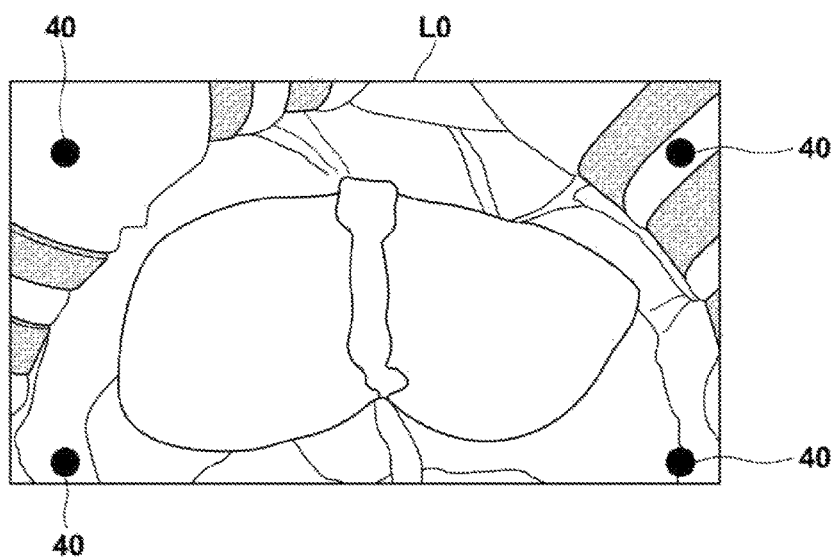
FIG. 9 is a diagram that illustrates a video in which markers are imparted onto a subject.

In addition, the invariable points which are included in the video L0 are employed to detect the second movement M2 in the embodiment described above. Alternatively, the subject 7 may be provided with a plurality of markers. FIG. 9 is a diagram that illustrates a video obtained by imaging a subject 7 to which markers are imparted. In the video L0 illustrated in FIG. 9, four markers 40 are provided so as to surround the liver. By providing the markers 40 in this manner, the markers 40 which are included in the video L0 may be employed as the invariable points. In addition, in the case that the markers 40 are provided in this manner, it is preferable for a plurality of reference points to be set within the region surrounded by the plurality of markers 40. Thereby, the movement of the camera 14 and the movements of the reference points will be comparatively inked. Therefore, the degree of reliability can be calculated more accurately.

In addition, evaluation of reference points and positional alignment are performed employing the reference points which are set within the initial image Tf. However, reference points may also be newly set in a new first image T1. In this case, a plurality of coordinate positions which are set within the new first image T1 in advance may be set as the reference points, in order to shorten the amount of time required for calculations. In this case, the coordinate positions may be determined such that the plurality of reference points are arranged at equidistance intervals, or the coordinate positions may be determined randomly. Note that in the case that reference points are newly set in a new first image T1 in this manner, reference points will not be continuously set at the same positions within the video L0. For this reason, it is preferable for the degrees of reliability to be updated by stored degrees of reliability being replaced by degrees of reliability which are newly calculated for a plurality of reference points instead of being updated by cumulatively storing degrees of reliability which are calculated for a plurality of reference points.

In addition, in the embodiment described above, the video L0 and the simulation data S0 are overlapped and displayed on the tablet terminal. However, the present disclosure may also be applied to a case in which the position of simulation data S0 is aligned with a video L0 and displayed on a head mount display as well. In addition, the present disclosure may also be applied to a case in which the position of simulation data S0 is aligned with a video L0, which is obtained by imaging with a camera provided above an operating table and displayed on a display within or outside an operating room as well. In this case, the position aligning apparatus 1 is installed in a computer, positional alignment of the video L0 and the simulation data S0 is performed by the computer, and the video L0 and the simulation S0 are overlapped and displayed on the head mount display or the display connected to the computer, or on the computer itself.

In addition, in the embodiment described above, a projected image of the liver which is extracted from the three dimensional image V0 is employed as the simulation data S0. However, the present disclosure is not limited to such a configuration, and functional three dimensional images obtained by PET examination or Nuclear Medical examination, a lines that represents a excision position, symbols such as arrows, and text data that indicate the name of a portion to be excised and the names of tissues may be employed as the simulation data. In addition, combinations of image data, symbols, and text data may be employed as the simulation data.

In addition, the simulation data S0 is generated by the simulation data obtaining unit 22 in the embodiment described above. Alternatively, the simulation data S0 may be generated a simulation data obtaining apparatus provided separately from the position aligning apparatus 1. In this case, it will not be necessary for the simulation data obtaining unit 22 to generate the simulation data S0, and therefore the configuration of the apparatus can be simplified.

In addition, initial positional alignment is performed by changing the simulation data S0 by parallel movement, rotational movement, magnification or reduction, and the orientation thereof in the embodiment described above. Alternatively, a plurality of pieces of simulation data oriented in different directions may be prepared, and a piece of simulation data of which the orientation most matches the orientation of a target portion included in the video L0 may be selected when performing initial positional alignment.

In addition, the hepatic arteries and the like which are included in the liver are extracted and included in the simulation data S0 in the embodiment described above. Alternatively, only the liver, which is the target portion of surgery, may be extracted, and an image that represents the three dimensional shape of only the liver may be employed as the simulation data S0. In this case as well, the simulation data S0 may be that which only include the contour of the liver.

In addition, the liver is employed as the target portion of surgery. However, the present disclosure is not limited to such a configuration, and the present disclosure may be applied to cases in which other arbitrary portions are targets of surgery.

Hereinafter, the advantageous effects of the present disclosure will be described.

The movements of reference points can be evaluated based on the latest degrees of reliability, by updating the degree of reliability with respect to each of the plurality of reference points.

In addition, by the cumulatively stored degrees of reliability being initialized 0 in the case that the calculation of degrees of reliability has been repeated a first number of times, calculation of the degrees of reliability will be restarted. Therefore, the degrees of reliability can be calculated from the beginning even in cases that the video changes greatly, and accurate calculation of degrees of reliability can be continued.

In addition, by increasing the interval between the first image and the second image in the case that calculation of the degree of reliability is repeated a second number of times such that the interval between the first image and the second image is greater than that prior to the calculation of the degree of reliability being repeated the second number of times, the frequency at which the degrees of reliability are calculated can be decreased. Therefore, frequency at which the degrees of reliability are calculated can be decreased. Therefore, the amount of calculations required to calculate the degrees of reliability can be reduced. In addition, the degrees of reliability are updated after being calculated a predetermined number of times. Therefore, the accuracy of the updated degrees of reliability will also be maintained.

In addition, by detecting the movement of the imaging means based on the movements of the invariable points which are included in each of the first image and the second image, the movement of the imaging means can be accurately detected.

In addition, by setting the plurality of reference points within a region surrounded by the plurality of markers within the first image, the movement of the imaging means and the movements of the reference points will be linked. Therefore, the degrees of reliability can be calculated more accurately.

In addition, by the second movement detecting means being a sensor provided in the imaging means that detects movement of the imaging means, the movement of the imaging means can be detected expediently, without performing calculations.

In addition, when the first judgment regarding whether the second movement has been detected is performed, in the case that the result of the first judgment is affirmative, the positions of the target object included in the video and the simulation data are aligned based on the second movement. In the case that the result of the first judgment is negative, the positions of the target object included in the video and the simulation data are aligned based on the first movements of reference points having degrees of reliability greater than or equal to the predetermined second threshold value. Thereby, movement of the simulation data can accurately track movement in the video caused by movement of the imaging means even in cases that movement of the camera 14 cannot be detected for any reason.

In addition, when the second judgment regarding whether reference points having degrees of reliability greater than or equal to the second threshold value is performed, in the case that the result of the first judgment is negative and the result of the second judgment is affirmative, the positions of the target object included in the video and the simulation data are aligned based on the first movements of reference points having degrees of reliability greater than or equal to the predetermined second threshold value. In the case that the result of the first judgment is negative and the result of the second judgment is negative, the warning is issued. Therefore, an operator can be notified that movement of the imaging means was not detected, and that the degree of reliability with respect to movements of the reference points is low. Thereby, the operator can take measures such as redoing initial positional alignment.

What is claimed is:
1. A position aligning apparatus, comprising:
   a camera for obtaining a video constituted by at least a first image and a second image, the first image and the second image including an image of a structure within a human body and having different imaging times; and
   at least one processor configured to:
   compare the first image and the second image of a different time than the first image, from among images that constitute the video, and to detect the movements between each of a plurality of reference points within the first image and corresponding reference points included in the second image as first movements, the movements occurring between a time that the first image is obtained and a time that the second image is obtained;
   detect movements between one or more invariable points within the first image and corresponding invariable points included in the second image as second movements, which is the movement of the camera, the movements occurring between the time that the first image is obtained and the time that the second image is obtained, wherein the invariable points are within the imaging range of the camera that do not change as imaging of the video progresses, and wherein the invariable points are different from the reference points;

compare the first movements and the second movement, and for calculating a degree of reliability with respect to the movements of each of the reference points;

obtain simulation data of target object included in the video;

perform initial positional alignment of the target object included in the video and the simulation data;

perform positional alignment of the target object included in the video and the simulation data based on the second movement; and display aligned simulation data and the video on which the simulation data is overlapped, wherein the at least one processor performs a first judgment regarding whether it is possible to detect the second movement, performs positional alignment of the target object included in the video and the simulation data based on the second movement in the case that the result of the first judgment is affirmative, and performs positional alignment of the target object included in the video and the simulation data based on first movements of reference points having degrees of reliability greater than or equal to a second threshold value, which is set in advance, in the case that the result of the first judgment is negative.

2. A reference point evaluating apparatus as defined in claim 1, the at least one processor further configured to:
update the degrees of reliability calculated for each of the plurality of reference points.

3. A reference point evaluating apparatus as defined in claim 2, wherein:
the at least one processor updates the degree of reliability by designating each temporally sequential image that constitutes the video as the first image, and repeats the processes of detecting the first movements, detecting the second movement, and calculating the degree of reliability.

4. A reference point evaluating apparatus as defined in claim 3, wherein:
the at least one processor updates the degree of reliability by correlating repetitively calculated degrees of reliability with each of the plurality of reference points, and cumulatively storing the degrees of reliability.

5. A reference point evaluating apparatus as defined in claim 4, wherein:
the at least one processor initializes the cumulatively stored degrees of reliability in the case that the calculation of degrees of reliability has been repeated a first number of times, the number being set in advance.

6. A reference point evaluating apparatus as defined in claim 3, wherein:
the at least one processor increases the interval between the first image and the second image in the case that calculation of the degree of reliability is repeated a second number of times, the number being set in advance, such that the interval between the first image and the second image is greater than that prior to the calculation of the degree of reliability being repeated the second number of times.

7. A reference point evaluating apparatus as defined in claim 2, wherein:
the at least one processor excludes reference points having updated degrees of reliability which are less than a first threshold value, which is set in advance, from the calculation of the degree of reliability.

8. A reference point evaluating apparatus as defined in claim 1, wherein:
the at least one processor detects the movement of the camera based on the movements of invariable points which are included in each of the first image and the second image.

9. A reference point evaluating apparatus as defined in claim 8, wherein:
the invariable points are a plurality of markers which are positioned within the imaging range of the camera.

10. A reference point evaluating apparatus as defined in claim 9, wherein:
the at least one processor sets a plurality of reference points within a region surrounded by the plurality of markers in the first image.

11. A reference point evaluating apparatus as defined in claim 1, further comprising:
a sensor provided on the camera that detects movement of the camera.

12. A position aligning apparatus as defined in claim 1, wherein:
the at least one processor performs a second judgment regarding whether a reference point having a degree of reliability greater than or equal to the second threshold value exists, performs positional alignment of the target object included in the video and the simulation data based on the movements of reference points having degrees of reliability greater than or equal to the second threshold value in the case that the result of the first judgment is negative and the result of the second judgment is affirmative, and issues a warning in the case that the result of the first judgment is negative and the result of the second judgment is negative.

13. A reference point evaluating method comprising:
obtaining a video constituted by at least a first image and a second image, the first image and the second image including an image of a structure within a human body and having different imaging times;

comparing the first image and the second image of a different time than the first image, from among images that constitute the video, and detecting the movements between each of a plurality of reference points within the first image and corresponding reference points included in the second image as first movements, the movements occurring between a time that the first image is obtained and a time that the second image is obtained;

detecting movements between one or more invariable points within the first image and corresponding invariable points included in the second image as second movements, which is the movement of the camera, the movements occurring between the time that the first image is obtained and the time that the second image is obtained, wherein the invariable points are within the imaging range of the camera that do not change as imaging of the video progresses, and wherein the invariable points are different from the reference points;

comparing the first movements and the second movement, and calculating a degree of reliability with respect to the movements of each of the reference points;

obtaining simulation data of target object included in the video;

performing initial positional alignment of the target object included in the video and the simulation data;

performing positional alignment of the target object included in the video and the simulation data based on the second movement; and displaying aligned simulation data and the video on which the simulation data is overlapped, wherein the at least one processor performs a first judgment regarding whether it is possible to detect the second movement, performs positional alignment of the target object included in the video and the simulation data based on the second movement in the case that the result of the first judgment is affirmative, and performs positional alignment of the target object included in the video and the simulation data based on first movements of reference points having degrees of reliability greater than or equal to a second threshold value, which is set in advance, in the case that the result of the first judgment is negative.

14. A position aligning method comprising:

detecting first movements, detecting a second movement, and calculating a degree of reliability by the reference point evaluating method defined in claim 13;

obtaining simulation data of a target object included in the video;

performing initial positional alignment of the target object included in the video and the simulation data; and performing positional alignment of the target object included in the video and the simulation data based on the second movement.

15. A non-transitory recording medium having a reference point evaluating program recorded therein, the program causing a computer to execute the procedures of:

obtaining a video constituted by at least a first image and a second image, the first image and the second image including an image of a structure within a human body having different imaging times;

comparing the first image and the second image of a different time than the first image, from among images that constitute the video, and detecting the movements between each of a plurality of reference points within the first image and corresponding reference points included in the second image as first movements, the movements occurring between a time that the first image is obtained and a time that the second image is obtained;

detecting movements between one or more invariable points within the first image and corresponding invariable points included in the second image as second movements, which is the movement of the camera, the movements occurring between the time that the first image is obtained and the time that the second image is obtained, wherein the invariable points are within the imaging range of the camera that do not change as imaging of the video progresses, and wherein the invariable points are different from the reference points;

comparing the first movements and the second movement, and calculating a degree of reliability with respect to the movements of each of the reference points;

obtaining simulation data of target object included in the video;

performing initial positional alignment of the target object included in the video and the simulation data;

performing positional alignment of the target object included in the video and the simulation data based on the second movement; and displaying aligned simulation data and the video on which the simulation data is overlapped, wherein the at least one processor performs a first judgment regarding whether it is possible to detect the second movement, performs positional alignment of the target object included in the video and the simulation data based on the second movement in the case that the result of the first judgment is affirmative, and performs positional alignment of the target object included in the video and the simulation data based on first movements of reference points having degrees of reliability greater than or equal to a second threshold value, which is set in advance, in the case that the result of the first judgment is negative.

16. A non-transitory recording medium having a position aligning program recorded therein, the program causing a computer to execute the procedures of:

detecting first movements, detecting a second movement, and calculating a degree of reliability by the reference point evaluating program defined in claim 15;

obtaining simulation data of a target object included in the video;

performing initial positional alignment of the target object included in the video and the simulation data; and performing positional alignment of the target object included in the video and the simulation data based on the second movement.

17. A reference point evaluating apparatus, comprising:

a camera for obtaining a video constituted by at least a first image and a second image, the first image and the second image including an image of a structure within a human body having different imaging times; and at least one processor configured to:
  compare a first image and a second image of a different time than the first image, from among images that constitute the video, and detect the movements of each of a plurality of reference points within the first image between the first image and the second image as first movements;
  obtain simulation data of target object included in the video;
  perform initial positional alignment of the target object included in the video and the simulation data;
  perform positional alignment of the target object included in the video and the simulation data based on the second movement; and
  display aligned simulation data and the video on which the simulation data is overlapped, wherein the at least one processor performs a first judgment regarding whether it is possible to detect the second movement, performs positional alignment of the target object included in the video and the simulation data based on the second movement in the case that the result of the first judgment is affirmative, and performs positional alignment of the target object included in the video and the simulation data based on first movements of reference points having degrees of reliability greater than or equal to a second threshold value, which is set in advance, in the case that the result of the first judgment is negative, and a motion sensor that detects movement of the camera between a time when the first image was obtained and a time when the second image was obtained as a second movement;

wherein the processor is further configured to compare the first movements and the second movement, and calculate a degree of reliability with respect to the movements of each of the reference points.

18. A reference point evaluating method, comprising:
obtaining a video, captured via a camera, constituted by at least a first image and a second image, the first image and the second image including an image of a structure within a human body having different imaging times; and
compare, via at least one processor, a first image and a second image of a different time than the first image, from among images that constitute the video, and detect the movements of each of a plurality of reference points within the first image between the first image and the second image as first movements;
detect movement of the camera, via a motion sensor that detects movement of the camera, between a time when the first image was obtained and a time when the second image was obtained as a second movement;
compare, via the at least one processor, the first movements and the second movement, and calculate a degree of reliability with respect to the movements of each of the reference points;
obtain simulation data of target object included in the video;
perform initial positional alignment of the target object included in the video and the simulation data;
perform positional alignment of the target object included in the video and the simulation data based on the second movement; and
display aligned simulation data and the video on which the simulation data is overlapped,
wherein the at least one processor performs a first judgment regarding whether it is possible to detect the second movement, performs positional alignment of the target object included in the video and the simulation data based on the second movement in the case that the result of the first judgment is affirmative, and performs positional alignment of the target object included in the video and the simulation data based on first movements of reference points having degrees of reliability greater than or equal to a second threshold value, which is set in advance, in the case that the result of the first judgment is negative.

19. A non-transitory recording medium having a position aligning program recorded therein, the program causing a computer to execute the procedures of:
obtaining a video, captured via a camera, constituted by at least a first image and a second image, the first image and the second image including an image of a structure within a human body having different imaging times; and
compare, via at least one processor, a first image and a second image of a different time than the first image, from among images that constitute the video, and detect the movements of each of a plurality of reference points within the first image between the first image and the second image as first movements;
detect movement of the camera, via a motion sensor that detects movement of the camera, between a time when the first image was obtained and a time when the second image was obtained as a second movement;
compare, via the at least one processor, the first movements and the second movement, and calculate a degree of reliability with respect to the movements of each of the reference points;
obtain simulation data of target object included in the video;
perform initial positional alignment of the target object included in the video and the simulation data;
perform positional alignment of the target object included in the video and the simulation data based on the second movement; and
display aligned simulation data and the video on which the simulation data is overlapped,
wherein the at least one processor performs a first judgment regarding whether it is possible to detect the second movement, performs positional alignment of the target object included in the video and the simulation data based on the second movement in the case that the result of the first judgment is affirmative, and performs positional alignment of the target object included in the video and the simulation data based on first movements of reference points having degrees of reliability greater than or equal to a second threshold value, which is set in advance, in the case that the result of the first judgment is negative.

* * * * *